Apr. 24, 1923.
O. W. GORENFLO
1,452,910
CHATTERLESS LUG AND PEDAL SHAFT SUPPORT
Filed March 23, 1922
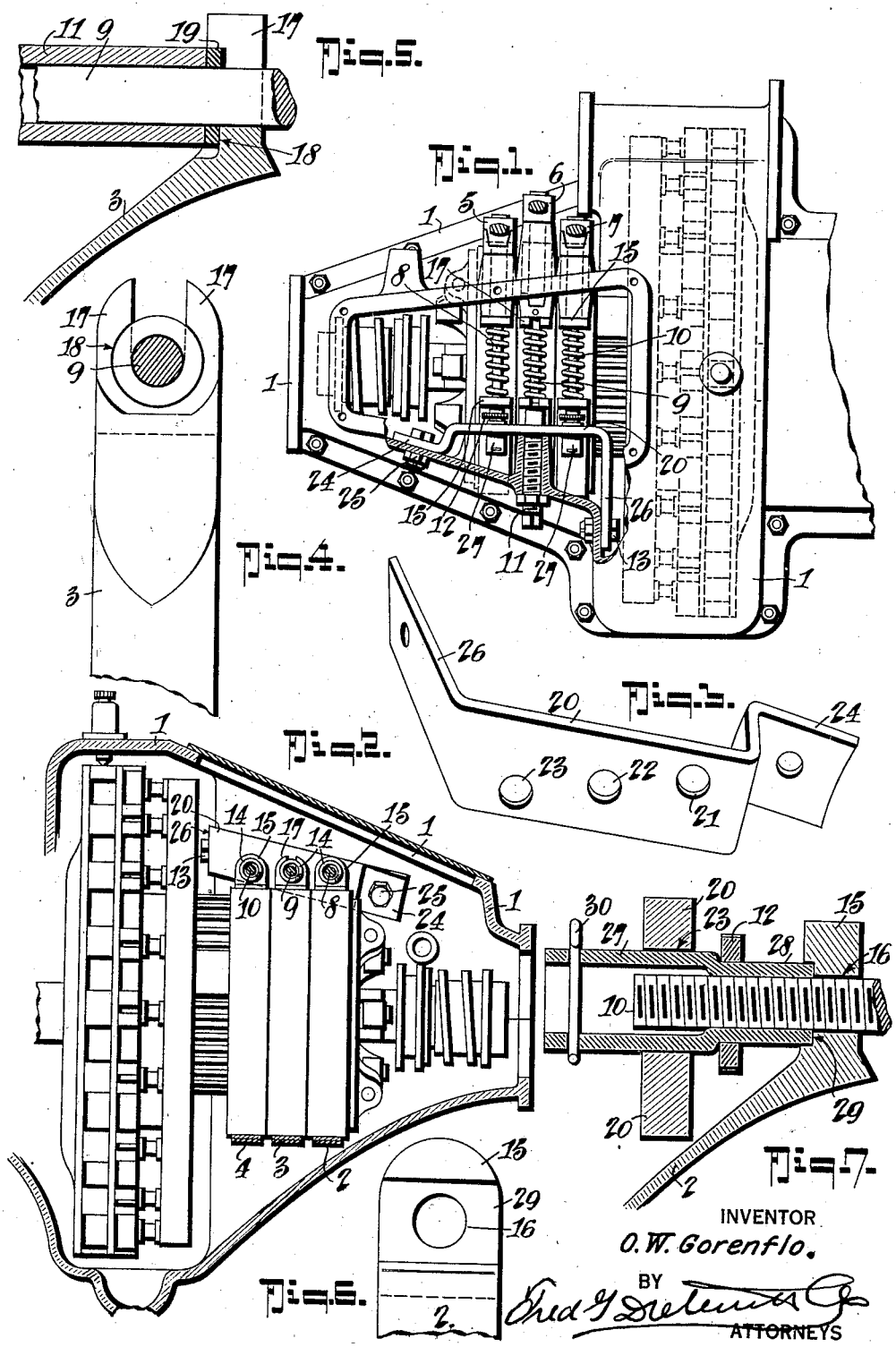
INVENTOR
O. W. Gorenflo.
BY
Fred J. Dieterich
ATTORNEYS Patented Apr. 24, 1923.

1,452,910

UNITED STATES PATENT OFFICE.

OSCAR W. GORENFLO, OF BUFFALO, NEW YORK.

CHATTERLESS LUG AND PEDAL-SHAFT SUPPORT.

Application filed March 23, 1922. Serial No. 546,096.

*To all whom it may concern:*

Be it known that I, OSCAR W. GORENFLO, a citizen of the United States, residing at Buffalo, in the county of Erie and State of New York, have invented certain new and useful Chatterless Lugs and Pedal-Shaft Supports, of which the following is a specification.

My invention relates to certain new and useful improvements in a well known make of automobile. In cars of this make the transmission system is of the planetary type employing, together with the service brake, two sets of transmission drums and bands operated by pedals and cams which, when the pedal is pushed forward, draw the transmission band tightly around its respective drum to hold the same.

In the make of automobile referred to, the transmission bands are provided with bifurcated lugs through which the pedal shafts pass and between each pair of which a separating spring is located. These bands are supported wholly on their respective drums and, when drawn into gripping engagement, they slip causing chattering and shaking of the parts which is quite injurious to the machinery.

Furthermore only one of the three of the pedal shafts is supported at both ends, the other two are without supports at their inner ends, thus adding to the chattering or slipping effect due to the vibration of these shafts.

My invention, therefore, has for its object to provide mechanism for eliminating the objectionable features noted and provide a convenient and inexpensive way of eliminating the chatter and causing the bands to effect a smooth gentle grip on their respective drums.

My invention, in its general nature, comprises the provision of means for supporting the free ends of the brake and reverse pedal shafts against vibration and to provide such construction of lugs on the transmission bands as will suspend or hang the bands from the respective pedal shafts in such a way as to prevent them from dragging or slipping down into engagement with the transmission drums and brake drum respectively when they are not to be applied.

In its more detailed nature, the invention further resides in those novel features of construction, combination and arrangement of parts, all of which will be first fully described, then be specifically pointed out in the appended claims, reference being had to the accompanying drawings, in which:

Figure 1 is a detail plan view and part section of a portion of a transmission unit embodying the invention.

Figure 2 is a vertical longitudinal section and part elevation of the mechanism shown in Figure 1.

Figure 3 is a detail perspective view of the shaft end support.

Figure 4 is a detail elevation and part section of one of the lugs for the slow speed transmission band.

Figure 5 is a detail vertical section thereof.

Figure 6 is a detail elevation of one of the lugs for the brake band and the reverse transmission band.

Figure 7 is an enlarged detail section showing how the end of the brake and reverse pedal are guided in the support 20.

In the drawings in which like numerals of reference indicate like parts in all of the figures, 1 is the transmission housing which contains the usual transmission mechanism that includes the brake band 2, the slow speed band 3 and the reverse band 4 for cooperating with their respective drums of the transmission mechanism. 5 designates the reverse pedal, 6 the brake pedal and 7 the clutch pedal while their respective shafts are designated by 8, 9 and 10. All of these parts may be of the usual construction, though I prefer in using my invention, to substitute elongated shafts 8 and 10 in order to give ample bearing in the support member 20 hereinafter again referred to.

Sleeve 11 designates the adjusting screw for the slow speed. 14 indicates the transmission band springs.

In carrying out my invention, I provide lugs 15 having apertures 16 to fit on the shafts 8 and 10, the lugs 15 being used only on the brake band and reverse bands. For the slow speed band 3, however, I provide the usual bifurcated lugs 17 but counterbore them at 18 to receive bearing washers 19 that are apertured to fit on the shaft 9.

20 is a bearing plate which is provided with apertures of suitable size and location 21, 22 and 23, the apertures 21 and 23 receiving the sleeves 27 that are threaded on the ends of the shafts 8 and 10, respectively, while the aperture 22 is made to fit over the smooth end of the adjusting screw 11. The plate 20 has a leg 24 by which it is secured at 25 to the transmission housing and has another leg 26 that rests against and is secured to the transmission housing at 13, thereby affording ample bracing facility to sustain the shafts 8, 9 and 10 in chatterless relatively fixed positions, the shafts then being susceptible only to movement in the direction of their axes.

The sleeves 27 have squared portions 28 bored and tapped to screw onto the shafts 8 and 10. On this squared part of each sleeve is a knurled member 12 which has a square hole and is forced onto the sleeve parts 28, while the lug 15 has a recess 29 to receive the squared end of 28 and hold the sleeve from turning after it has been adjusted to position. Cotter pins 30 serve to prevent the sleeves 27 being pulled out of the support 20.

It will thus be seen that with my construction, the brake band lugs are suspended on the respective shafts and, when braking pressure is applied to squeeze the pairs of lugs together, they will not slip down and cause chattering but the bands 2, 3 and 4 will be brought into gripping engagement with their respective drums in a smooth and noiseless way.

While I prefer to make the lugs for the bands 2 and 4 of the solid apertured type as distinguished from the bifurcated type, still the bifurcated lugs may be used also on the bands 2 and 4, if desired, provided they are counterbored and have bearing washers similar to the washers 19 in Figures 4 and 5. The bifurcated lugs are necessary on the band 3 because of the difficulty of removing the shaft 9 by endwise movement. The shafts 8 and 10 can be endwise withdrawn, in order to replace the bands, without great difficulty but the shaft 9 is pinned in and in order to remove it it will be necessary to unpin the cam part which it carries. Therefore, the use of the bifurcated lugs with counterbore and bearing washer on this band 3 is preferable.

From the foregoing description, taken in connection with the accompanying drawings, the construction and advantages of my invention will be clear to those skilled in the art to which it appertains.

What I claim is:

1. In a transmission mechanism of the kind described, comprising a transmission housing a plurality of drums, transmission bands encircling said drums, pedal shafts cooperating with said bands for drawing them together; a base having bearing apertures for said shafts and means for securing said base in place in the transmission housing to sustain the ends of said shafts.

2. In a transmission mechanism of the type wherein is provided a plurality of drums, transmission bands encircling said drums, cam actuated pedal shafts cooperating with said bands for drawing them together, of means for supporting said bands from said shafts and other means for supporting said shafts against chattering.

3. In a transmission mechanism of the type wherein is provided three drums, a band for each drum, a pedal shaft cooperating with each band and a transmission housing; a bracket member with means for securing it to the transmission housing and having bearing portions for the free ends of the shafts to sustain the same against chattering, and lugs on the transmission bands having provision for sustaining the bands suspended on said shafts.

4. In a transmission mechanism of the type wherein is provided a drum, a band encircling the drum, an endwise movable cam shaft for drawing said band together into gripping engagement with the drum, and a separating spring on the shaft for separating the band from gripping engagement with the drum; of band lugs secured to the band and each having a bearing aperture to fit on the shaft and suspend the band from the shaft with the axes of the bearing apertures of the lugs coincident with the axis of the shaft.

5. As a new article of manufacture, a transmission band lug for planetary type transmissions comprising a bifurcated member having a counterbore, and a bearing washer located in said counterbore and apertured to fit on the pedal shaft.

6. As a new article of manufacture, a transmission band lug for planetary type transmissions comprising a member having a recess and a bearing element located in said recess and apertured to fit on the pedal shaft, said lug being also apertured to fit on the pedal shaft.

7. In a transmission mechanism of the type wherein is provided a transmission housing, a drum, a transmission band for said drum, a pedal shaft with cam and spring devices to cooperate with said band; a bracket member, means securng said bracket member to the transmission housing, said bracket member having a bearing aperture, a sleeve endwise adjustable on said shaft and located in said bearing aperture of said bracket member and lugs on the transmission band having provision for sustaining the band suspended on said shaft.

8. In a transmission mechanism of the type wherein is provided a transmission housing, a drum, a transmission band for said drum, a pedal shaft with cam and spring devices to cooperate with said band;

a bracket member, means securing said bracket member to the transmission housing, said bracket member having a bearing aperture, a sleeve endwise adjustable on said shaft and located in said bearing aperture of said bracket member and lugs on the transmission band having provision for sustaining the band suspended on said shaft, one of said lugs having a recess, said sleeve having a squared end to fit said recess and hold said sleeve against turning on said shaft.

OSCAR W. GORENFLO.